United States Patent [19]

Sell et al.

[11] 4,161,411

[45] Jul. 17, 1979

[54] CEMENT DUST BRIQUETTES AND PROCESS OF PRODUCTION THEREOF

[76] Inventors: Nancy J. Sell, 3244 Peterson Rd., Green Bay, Wis. 54301; June E. Doyen, 3240 Old Mill Rd., Northbrook, Ill. 60062

[21] Appl. No.: 807,161

[22] Filed: Jun. 16, 1977

[51] Int. Cl.² .................................................. C04B 7/40
[52] U.S. Cl. ................................... 106/100; 106/103
[58] Field of Search ............... 106/100, 103, 89, 38.2, 106/38.22, 38.24; 264/338

[56] References Cited

U.S. PATENT DOCUMENTS

| | | | |
|---|---|---|---|
| 2,400,001 | 5/1946 | Grupelli | 106/38.24 |
| 2,687,290 | 8/1954 | Garoutte et al. | 106/100 |
| 2,769,719 | 11/1956 | De Vaney | 106/89 |
| 2,871,133 | 1/1959 | Palonen et al. | 106/100 |
| 3,414,643 | 12/1968 | Collie | 264/338 |
| 4,001,030 | 1/1977 | Watson et al. | 106/103 |

*Primary Examiner*—James Poer
*Attorney, Agent, or Firm*—Holman & Stern

[57] ABSTRACT

Cement dust briquettes or pellets and process for producing same by compacting cement dust at compacting pressures sufficient to form briquettes or pellets having a high crushing strength and simultaneously with such formation encapsulating said briquettes or pellets with a mineral oil or the like.

15 Claims, 4 Drawing Figures

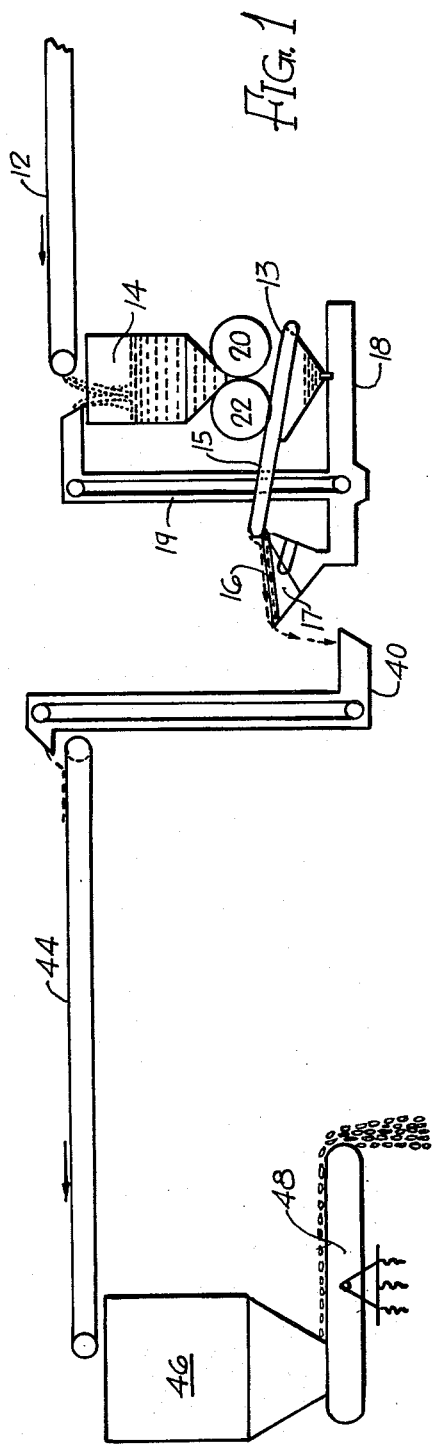
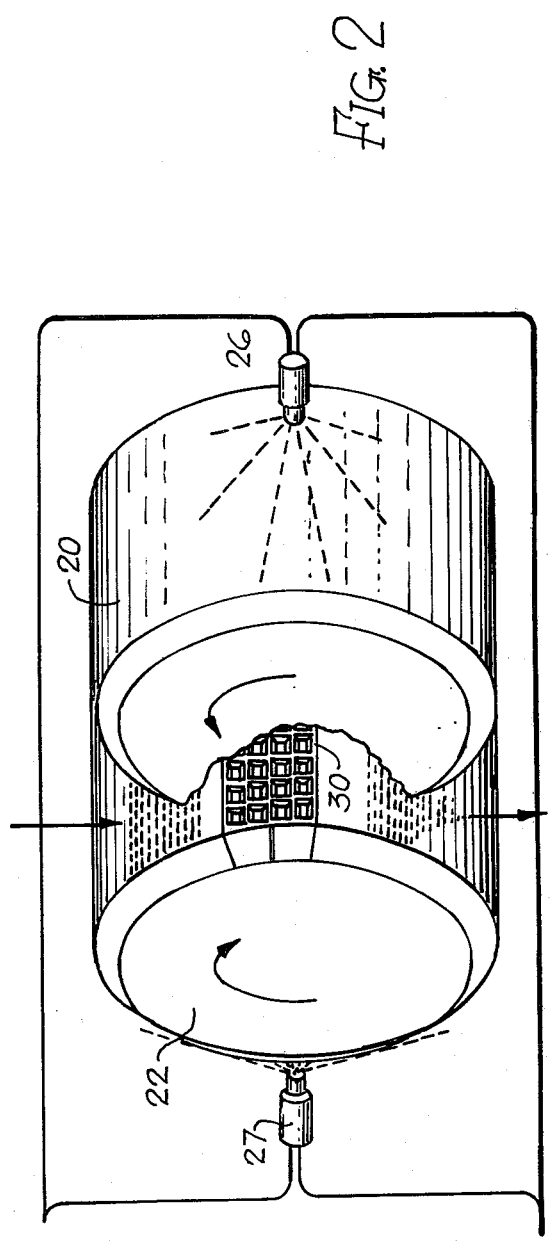

CEMENT DUST BRIQUETTES AND PROCESS OF PRODUCTION THEREOF

BACKGROUND OF THE INVENTION

This invention relates to novel Portland cement (hereafter "cement") dust briquettes or pellets (hereafter "briquettes") and process of producing the same. In another aspect, this invention relates to a process of producing cement by recycling into the Portland cement process Portland cement dust which has been recovered in said cement process and converted into said novel briquettes which are then used by recycling the same into the cement kiln with cement-producing ingredients.

In the production of cement, cement dust consisting of very fine particles of partially calcined raw materials is carried out of the kiln by the air velocity existing inside the kiln and the resulting escaping cement dust is either permitted to pollute the atmosphere or is sought to be returned by a recycling process to the kiln. Being finely divided, the reintroduction of the escaping cement dust into a kiln in its original state often does not result in complete calcining of the dust as most of the dust is again carried out of the kiln by the air velocity existing inside the kiln. Therefore, methods of agglomerating, pelletizing or briquetting said escaping dust have heretofore been proposed with the projected purpose of attempting to provide a more efficient method of recycling said dust back into the kiln. Previous methods of recycling the dust include mixing the dust with a slurry feed, feeding the dust into the kiln via scoops located tangentially on the kiln downward the chain section, agglomerating the dust with water or other materials, and insufflating the dust into the burning zone. As a practical proposition, these methods have not provided a satisfactory answer to the problem of recycling Portland cement dust. U.S. Pat. Nos. 2,140,471; 2,477,262; 2,687,290; 3,206,526; and 3,298,843 are illustrative of the foregoing and other approaches which have been disclosed in an effort to meet the problem. In U.S. Pat. No. 3,298,843, a procedure is disclosed in which the amount of cement dust, which forms when conventional kiln operations are carried out to produce cement, is reduced by initially forming compressed molded bodies of calcium oxide and calcium carbonate in certain proportions to each other, with or without binders such as water, alkaline earth metal hydroxides, heavy mineral oils, vegetable oils, spent liquors from paper making processes, and natural and synthetic plastic materials, and the resulting molded bodies are then calcined in a kiln at elevated temperatures.

The present invention provides novel cement dust briquettes and a process for producing the same under certain conditions which include compacting said cement dust under elevated pressures, the resulting briquettes being adapted to be recycled into the cement kiln, along with the cement producing ingredients, or otherwise introduced into the cement kiln in the cement making process. The novel cement dust briquettes of the present invention are characterized by a crushing strength sufficient to avoid undue disintegration or breakdown in handling and feeding the same into the cement kiln as in recycling operations.

In the production of the cement dust briquettes of the present invention, cement dust, which is recovered from the cement kiln in the cement producing process, is compacted under elevated pressure conditions in a mold while simultaneously encapsulating said briquette with a mineral oil or the like, whereby the resulting encapsulated cement dust briquette possesses sufficient crushing strengths so as to permit reintroduction of the briquettes into the kiln without disintegrating into fine dust particles. The briquettes of the present invention, as indicated above, are strong enough to withstand external forces encountered during recycling from the briquette formation area to reintroduction into the kiln, but the briquettes disintegrate in the kiln without allowing a substantial amount of fine dust particles from becoming airborne once again.

SUMMARY OF THE INVENTION

Cement dust briquettes are produced by compacting cement dust at compacting pressures sufficient to provide briquettes of adequate crushing strength and simultaneously encapsulating the briquettes with a mineral oil or the like.

In another aspect of the invention, recycled cement dust collected from a cement kiln is compacted at a compacting pressure sufficient to form briquettes having a high crushing strength while simultaneously encapsulating the briquettes with a mineral oil or the like, and returning the said encapsulated briquettes to the cement producing kiln.

In a further aspect of the invention, recycled cement dust collected from a rotary kiln is compacted at a compacting pressure to form briquettes having a high crushing strength, simultaneously encapsulating the briquettes with a mineral oil or the like and directing the said encapsulated briquettes into the burning zone of a rotary cement kiln.

It has been discovered, in accordance with the present invention, that, by applying a mineral oil or the like to the mold surfaces in which the cement dust briquettes are formed under compacting pressures, a mineral oil or the like-powdered cement dust material glaze or coating is formed on the briquette which imparts substantial crushing strength to the briquette so that breakdown to a powdered or dust-like state does not occur during handling, introduction into the cement kiln and calcination in the kiln in the cement making process as, for instance, in the rotary kiln.

BRIEF DESCRIPTION OF THE DRAWINGS

FIG. 1 is a schematic drawing of equipment for forming the cement briquettes and providing means for recycling cement dust;

FIG. 2 is an enlarged section of a part of the equipment of FIG. 1 depicting briquetting and encapsulating apparatus;

DETAILED DESCRIPTION OF THE INVENTION

Figure 4:
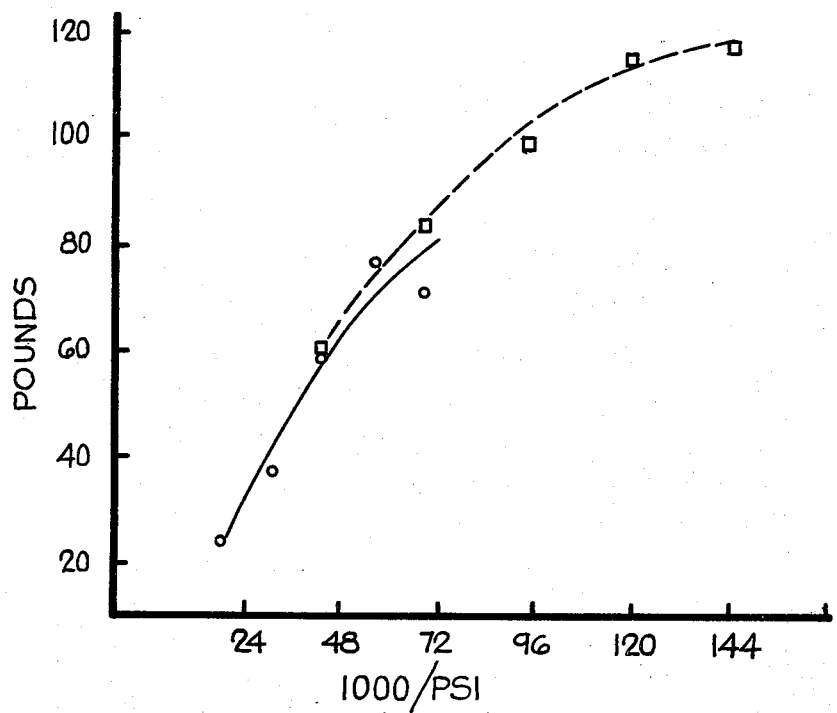
FIG. 4 is a graph plotting the pressure of compaction of a briquette of the present invention versus the crushing strength of said briquette.

In the manufacture of clinker cement material, raw materials such as calcium carbonate and aluminum silicates or clays rich in silica are admixed and calcined at high temperatures, as are conventionally used in cement-making processes, and the calcined material is thereafter cooled to produce a suitable clinker material which, when admixed with gypsum, produces cement.

In the operation of a kiln, not all of the raw materials injected into the kiln are calcined. This partially calcined material, consisting of very fine cement dust particles, is carried out of the kiln by the air velocity existing inside of the kiln and may either be dispersed to pollute the atmosphere or be returned to the kiln by recycling processes.

According to the present invention, as indicated above, the cement dust which issues from the cement kiln is converted to a briquette which is encapsulated in a mineral oil or the like, in the manner more particularly described below, by compacting the cement dust at a pressure advantageously of the order of at least about 20,000 psi and, more desirably, at least about 40,000 psi, or higher, thereby producing briquettes generally having a crushing strength of at least about 50 or 60 to 100 psi or more. Desirably, the cement dust which issues from the kiln is recovered, converted to the aforesaid encapsulated briquettes, and the latter are recycled back into the cement kiln, where they are admixed with raw clinker material, and thereafter calcined in any of various ways to produce cement.

In the preparation of the encapsulated briquettes made pursuant to the present invention, any type of compacting method such as pelletizing, prilling, aggregating or the like which is essentially equivalent to briquetting as the term is used herein, can be used which results in a briquette having high crushing strength, and which provides for the encapsulation of said briquette in a coating thereon of a mineral oil or the like. As mentioned above, pressures generally of at least about 20,000 psi and, better still, at least about 40,000 psi should be utilized. The pressure applied to the cement dust in order to provide briquettes is dependent upon the design of the cavities in which the cement dust is briquetted, the degree of filling, and the properties of the cement dust which is briquetted. It has been found that at lower compacting pressures than about 20,000 psi, the briquettes tend to disintegrate prior to reintroduction into the kiln and, in such case, the fine cement dust particles tend once again to be carried out of the kiln without having been calcined. Furthermore, as shown by the graph in FIG. 4, at compacting pressures above about 82,000 psi, the briquettes do not substantially have higher crushing strengths than the peak reached at about 82,000 psi. It is especially desirable to use compacting pressures in the range of about 50,000 to about 70,000 psi as optimum for formation of briquettes which will not disintegrate or which will undergo relatively minimal disintegration during processing prior to reintroduction into the kiln, but which will undergo normal clinkering reactions in the kiln.

Additives such as calcium chloride, and/or other chemicals, can be admixed with the dust prior to briquetting, in requisite proportions, but generally in the range of 2 to 10% by weight, to correct raw mill chemistry. Also, organic and inorganic binders such as molasses, lignins, gelatin and sodium silicate may be incorporated, but are not desired since such binders tend to initially soften the briquette until sufficient drying has taken place. Waiting for the binder to dry or cure is, of course, undesirable especially when the process of the present invention is operated as a continuous process. Moreover, even though organic binders will burn off when the briquette is in the cement kiln, such briquettes commonly tend to disintegrate into dust before the calcining step to produce the cement clinker has been completed. Therefore, while binding agents may be employed, it is a significant advantage of the present invention that such binders are unnecessary in that excellent results are achieved by using simply the mineral oil or the like coating procedures described herein.

Now referring to FIGS. 1 and 2, an embodiment of the present invention is described wherein cement kiln dust is recovered from a rotary cement kiln and, after processing to form the briquettes of and utilized in the practice of the present invention, is recycled for use as raw material. It should be understood that the present process of producing cement may be carried out in other types of kilns such as traveling grate and shaft kilns. As in shown more particularly in FIG. 1, cement dust is collected from the dust collector of a rotary kiln (not shown), placed on kiln cement dust collector conveyor 12, and carried along on conveyor 12 until discharged into cement dust storage bin 14. Thereafter, the dust is fed through a constant feed head onto a pair of briquette rollers 20 and 22.

Each of said briquette rollers 20 and 22 has a plurality of cavities which are arranged in rows running circumferentially around the face of the rollers as well as across the width of the face of the rollers. These cavities may be of any dimensional size, such as block, ovoid, or the like. The shape of the cavities plays a role as to the quality of the briquettes. Generally speaking, it has been found that the optimum configuration of the briquettes is of a somewhat almond shape. This shape has been found to produce a briquette which tends more readily to withstand the forces acting on it as it is processed for reintroduction into the kiln as well as providing for quick heating and clinker burning. Moreover, a briquette having a circumference of about ¾" to about 1" at its midpoint as well as a height of about 1" to 1¼", generally, has been found optimum.

As shown in FIG. 2, the briquette rollers 20 and 22 rotate in opposed directions and are fed kiln cement dust from bin 14 in sufficient quantities to fill each of the cavities across the respective roller faces. Prior to receiving the kiln cement dust, each individual cavity is sprayed with a mineral oil or the like which may be of a single viscosity such as a 10 weight grade oil, but is preferably a multi-viscosity oil such as 10W40 grade. The mineral oil is sprayed on the cavities by first and second spray heads 26 and 27 which may be conveniently located approximately 4 or 5 inches from their respective briquette rollers and a supply of the mineral oil is maintained in an oil supply tank, from which it is pumped by an oil pump (not shown) through an oil supply line (not shown) connected to said spray heads 26 and 27. An air supply (not shown) is also connected with spray heads 26 and 27 to provide the means for propelling the mineral oil onto the surfaces of the cavities in said rollers 20 and 22.

As the briquette rollers 20 and 22 rotate on their respective axes, the mineral oil is sprayed onto the surfaces of each cavity and thereafter the cement dust is placed or fed into said cavities in amounts to completely fill each cavity. As the cement dust is compacted under the aforementioned selected pressure to form the briquettes, the mineral oil encapsulates the cement dust by readily adhering to the dust, thereby producing what may be characterized as a glazed mantle over the dust. The briquettes fall from the rollers onto briquette conveyor 15.

Figure 3:
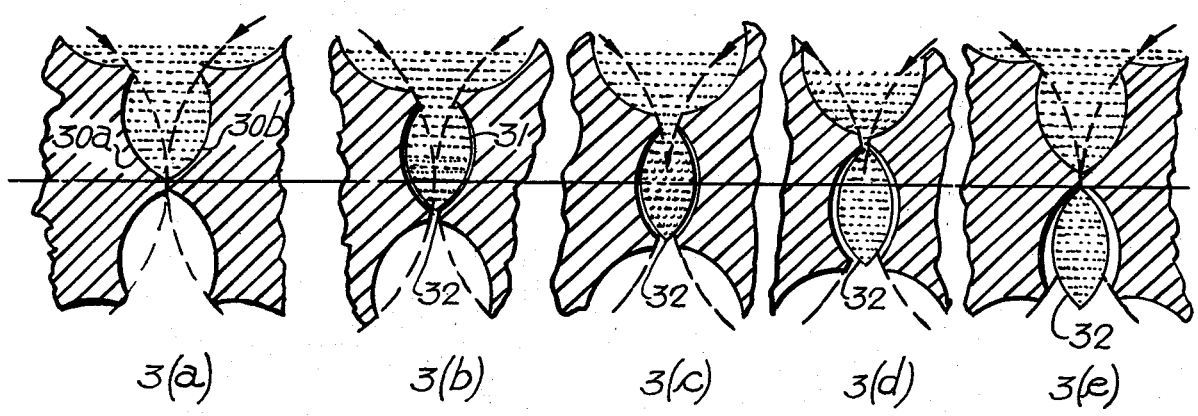
FIG. 3 is a drawing which depicts an illustrative embodiment of the sequential formation of a briquette according to the present invention.

Referring to FIG. 3, the sequence of formation of a briquette 32 is depicted. Cement dust fed from bin 14 through a constant feed head fills cavities 30a and 30b as seen in 3(a). Cavities 30a and 30b have a thin coating of mineral oil 31 already deposited thereon as described above and the cement dust from bin 14 readily adheres to the oil. As the briquette rollers 20 and 22 rotate in opposed directions, briquette 32 begins to take on its dimensional shape. As shown in 3(b), 3(c), and 3(d) briquette 32 is formed by the compacting force or pressure exerted on the cement dust as the cavities 30a and 30b practically mate while in a contiguous area. Finally, in 3(e) briquette 32 has been completely formed with a glaze or mantle of mineral oil-cement dust encapsulating briquette 32. Under gravitational force, briquette 32 falls from cavities 30a and 30b and is recycled into the cement kiln as described in detail below.

Referring again to FIG. 1, the briquettes formed, in the above described manner, are transported along briquette conveyor 15 to briquette chute 40. Any dust which is not compacted, or briquettes which are formed having smaller dimensional size than desired, will fall either through screen 16 of fine spill bin 17 or through a screen 13 in briquette conveyor 15 to a spill conveyor 18 and be reintroduced into dust storage bin 14 by means of fine return chute 19. After the briquettes having desired dimensional size are conveyed to briquette chute 40, they are transported to the briquette storage bin 46 by means of briquette conveyor 44.

Referring to FIG. 4, points have been plotted on a graph indicating the compacting pressure exerted to form various briquettes versus the crushing strength of the respective briquettes. Points plotted on the graph represent averages of compacting strength data which were collected by compacting kiln cement dust under various compacting pressures, and employing mineral oils, thus forming almond shaped briquettes having various crushing strengths and having aforementioned generally almond shape and dimensions. The following Table I represents data of briquettes formed by utilizing double pocket briquette rolls while Table II represents briquettes formed by utilizing single pocket briquette rolls. It is noted that only the averages of the crushing strengths obtained from each set of rolls is plotted on the graph of FIG. 4. It is evident from the graph that at pressures above about 80,000 psi, the crushing strength of the briquette thus formed generally does not increase with an increase in compacting pressure. After about 80,000 psi, the line connecting the plotted points begins to level off.

TABLE I

| | Crushing Strength Double Pocket rolls | | | | | |
|---|---|---|---|---|---|---|
| Hyd. Pressure, psi (corr. bq. Pressure, psi) | 1,000 (24,000) | 1,500 (36,000) | 2,000 (48,000) | 2,500 (60,000) | 3,000 (72,000) | 3,250 (78,000) |
| Resultant Crushing Strength, psi | 20 | 60 | 58 | 110 | 60 | 105 |
| | 45 | 55 | 80 | 100 | 70 | 120 |
| | 45 | 50 | 60 | 85 | 80 | 90 |
| | 20 | 30 | 95 | 60 | 115 | 105 |
| | 60 | 50 | 90 | 120 | 100 | 85 |
| | 48 | 70 | 100 | 95 | 100 | 110 |
| | 60 | 40 | 75 | 78 | 100 | 110 |
| | 40 | 60 | 65 | 85 | 110 | 90 |
| | 58 | 100 | 70 | 95 | 90 | 90 |
| | 40 | 55 | 90 | 140 | 90 | 120 |
| Average, psi | 43.6 | 57.0 | 78.3 | 96.8 | 91.5 | 102.5 |

TABLE II

| | Crushing Strength Single Pocket Rolls | | | | |
|---|---|---|---|---|---|
| Hyd. Pressure, psi (corr. bq. Pressure, psi) | 1,000 (48,000) | 1,500 (72,000) | 2,000 (96,000) | 2,500 (120,000) | 3,000 (144,000) |
| Crushing Strength, psi | 88 | 110 | 110 | 140–200 | 100 |
| | 95 | 80 | 120 | 140 | 160 |
| | 110 | 100 | 120 | 80–140 | 180 |
| | 80 | 90 | 100 | 160 | 180 |
| | 80 | 70 | 100 | 120 | 140 |
| | 70 | 120 | 140 | 140 | 160 |
| | 60 | 120 | 120 | 160 | 120 |
| | 70 | 120 | 140 | 160 | 110 |
| | 60 | 90 | 120 | 100 | 120 |
| | 80 | 140 | 120 | 150 | 110 |
| Average, psi | 79.3 | 114.0 | 119.0 | 135.0 | 138.0 |

The briquettes may be fed to the cement kiln in the same manner as and/or together with the conventional raw materials used in the cement formulations. Depending upon the particular crushing strength of the briquettes and other factors, the briquettes can also be fed into the cement kiln at a suitable position therein by projecting or propelling said pellets by means of any suitable gun or like propelling means into the burning zone of the cement kiln, for instance, at an angle of 6 to 8 degrees in relation to the horizontal plane of the kiln and desirably in the burning zone where the flame body is at its widest.

While, as noted above, mineral oils have been specifically described as being utilized for coating the surfaces of the molds or the like in which the briquettes are informed, and mineral oils represent the particularly important and advantageous embodiments of such coating materials utilized in the practice of the present invention, generally equivalent liquid materials can be used in place thereof or in conjunction therewith which will form a glaze-like coating on or encapulation of the briquettes. Such materials may comprise non-mineral oils or materials of generally oleaginous character such as vegetable or animal oils, silicone oils and the like. However, as stated, our invention is most effectively practiced with the utilization of mineral oils and especially mineral oils of the character specifically referred to above.

What is claimed is:

1. A process for producing kiln cement dust molded briquettes of high crushing strength and effective for use as a partial feed in cement making processes, comprising the steps of:
   (a) applying a mineral oil to the inner surfaces of cavity molds;
   (b) substantially filling said cavity molds with kiln cement dust collected from a cement kiln and being essentially free from extraneous binders; and
   (c) compacting said kiln cement dust between said mold surfaces under a pressure of at least 20,000 psi to thereby form mineral oil coated kiln cement dust molded briquettes.

2. A process for recycling kiln cement dust collected from a cement kiln comprising the steps of forming mineral oil coated kiln cement dust molded briquettes in accordance with the process of claim 1, and thereafter returning said briquettes to the cement kiln.

3. A mineral oil coated cement dust molded briquette of high crushing strength and effective for use as a partial feed in cement making processes, produced in accordance with the process of claim 1.

4. The process of claim 1 wherein the mineral oil is one which corresponds substantially to a 10 w 40 grade motor oil.

5. The process of claim 1 wherein the compacting pressure is from about 40,000 to about 80,000 psi.

6. The process of claim 1 wherein the crushing strength of the briquettes is in the range of about 50 to about 100 psi.

7. The process of claim 1 wherein the cement dust is compacted by depositing it into at least one cavity of a first briquette roller and into at least one cavity of a second briquette roller, wherein said briquette rollers rotate in opposed directions and have a contiguous area at which said cement dust in said cavities is compacted to form the briquettes.

8. The process of claim 7 wherein mineral oil is sprayed on said cavities of said first and second briquette rollers prior to introduction of said cement dust therein.

9. The process of claim 2 wherein said briquettes are returned to said cement kiln at the raw material inlet thereof.

10. The process of claim 2 wherein said briquettes are returned to the burning zone of said cement kiln.

11. The briquette of claim 3 in which the mineral oil is one which corresponds substantially to a 10 w 40 grade motor oil.

12. The briquette of claim 3 which has a crushing strength of at least 50 psi.

13. The briquette of claim 3 which has a crushing strength between about 50 and 100 psi.

14. The briquette of claim 3 which is of general almond shape.

15. The briquette of claim 3 having a circumference of about ¾" to about 1" at its midpoint and a height of about 1" to 1¼".

* * * * *